July 9, 1946.    G. MEYER    2,403,606

HOSE CLAMP

Filed March 8, 1943

INVENTOR
GERHARD MEYER
BY [signature]
ATTORNEY

Patented July 9, 1946

2,403,606

UNITED STATES PATENT OFFICE 2,403,606

HOSE CLAMP

Gerhard Meyer, Los Angeles, Calif., assignor to Lane-Wells Company, Los Angeles, Calif., a corporation of Delaware Application March 8, 1943, Serial No. 478,449

15 Claims. (Cl. 24—19)

My invention relates to hose clamps and among the objects of my invention are:

First, to provide a hose clamp which insures uniform constricting pressure about the bore without appreciable pressure components circumferentially about the hose, so that no part of the hose wall is under circumferential tension;

Second, to provide a hose clamp which, by reason of the uniform radial compression on the hose, is inherently satisfactory even after the hose has deteriorated by reason of extreme conditions of temperature and humidity;

Third, to provide a hose clamp which requires a minimum amount of force to draw it about the hose with the requisite tightness whereby a hand operated tightening means such as a thumb screw may be utilized;

Fourth, to provide a hose clamp which utilizes individually acting compressor shoes and a band therearound adapted to be constricted to urge the shoes against the rubber hose;

Fifth, to provide a hose clamp which is particularly designed for use on aircraft where the conditions of service are extreme; and Sixth, to provide a hose clamp which incorporates a novelly arranged tightening means.

With the above and other objects in view, as may appear hereinafter, reference is directed to the accompanying drawing, in which:

Figures 3, 4 and 5 are views of a modified form of my hose clamp in which Figure 3 is a partial sectional, partial plan view taken through 3—3 of Figure 4;

Figure 4 is a partial sectional, partial elevational view, the section being taken through 4—4 of Figure 3; and Figure 5 is a fragmentary sectional view taken through 5—5 of Figure 4.

Figure 1:
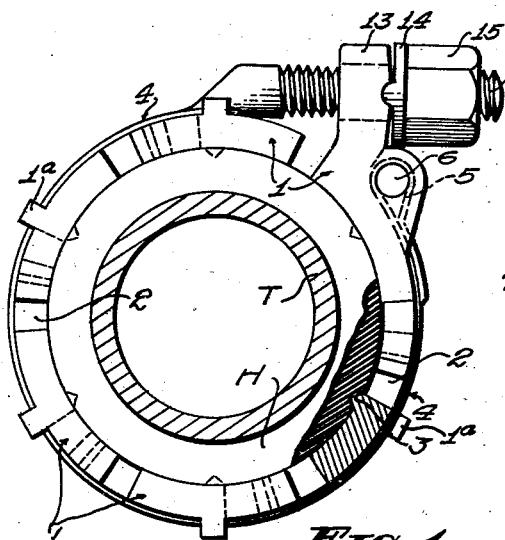
Figure 1 is an end elevational view of my hose clamp, shown clamping a section of hose to a tube.
Figure 2:
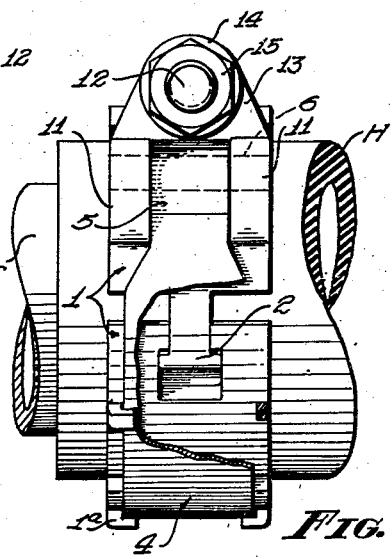
Figure 2 is a side elevational view thereof.

With reference first to Figures 1 and 2, the hose clamp is shown in relation to a tube T and a hose H, and comprises a plurality of segmental shoes 1 connected by suitable interlocking means 2 to permit the necessary closing or expanding of the space between the shoes occasioned by radial inward and outward movement of the shoes. Each of the shoes may be provided with one or more rudimentary cleats 3 extending across the shoe. A relatively thin, flexible constricting band 4 is adapted to fit around the shoes 1 and urge them radially inward. Lugs 1a may be provided on the shoes to guide the band and hold the shoes thereon. One end of the constricting band is provided with a loop 5 through which extends transversely an anchor pin 6.

In the structure shown in Figures 1 and 2, one of the shoes 1 is provided with a pair of radially outwardly extending anchor bosses 11 at the sides of the shoe, defining there between a slot adapted to receive the loop 5 of the constricting band. Holes are provided in the bosses 11 to receive the ends of the anchor pin 6. The other end of the constricting band 4 is provided with a threaded stem 12 welded or otherwise secured thereto and which extends substantially tangentally. The shoe carrying the anchor bosses 11 is also provided with a lug 13 positioned so that the threaded stem 12 may extend through an opening therethrough. The threaded stem 12 receives a washer 14 and a nut 15.

Tightening of the nut on the threaded stem 12 constricts the band 4, forcing the shoes 1 radially inward against the hose H so as to bring it into sealing contact with the tube T. The band slides relatively freely upon the outer faces of the shoes so that substantially uniform constricting pressure is exerted against all of the shoes. Thus each shoe moves radially inward from its initial position, compressing the hose H rather than placing any part of the hose under tension as would be the case where adjacent shoes are permitted to move arcuately away from each other, or as would be the case if the band 4 itself were in direct contact with the rubber hose. The application of the uniform constrictive pressure and the elimination of any tendency to place any part of the hose under tension is of primary importance in effecting a tight seal on the hose with a minimum of constrictive pressure, and at the same time minimizes the chance of failure of the hose by reason of the continued application of tension forces on the hose.

Figure 3:
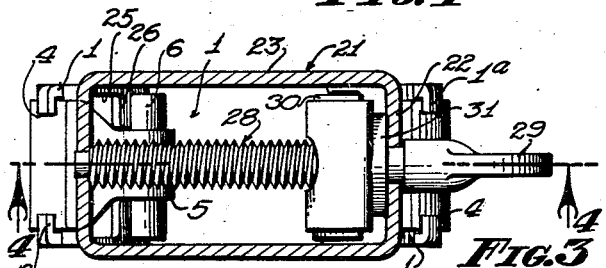
Figure 4:
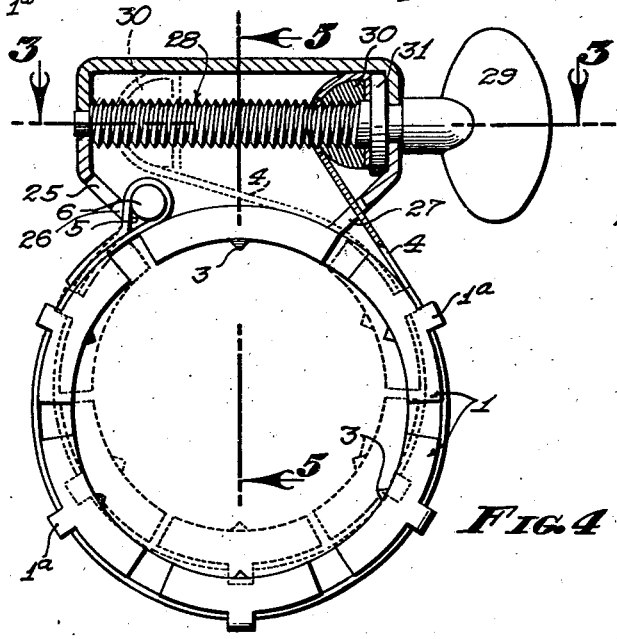
Figure 5:
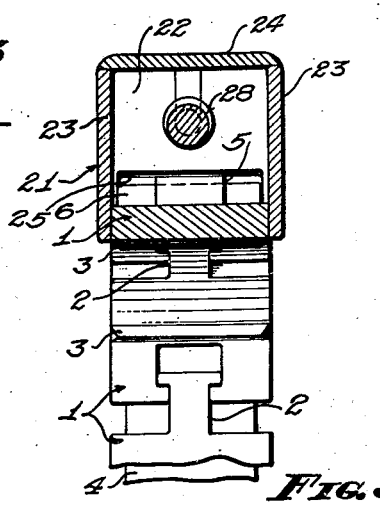

Reference is now directed to Figures 3, 4 and 5. The shoes 1, interlocking means 2, cleats 3, constricting band 4 with its loop 5 and anchor pin 6 are substantially the same as in the first described structure and are similarly numbered. In the structure shown in Figures 3, 4 and 5, a housing 21 is mounted over one of the shoes. This shoe may have greater arcuate dimensions than the others. The housing comprises end plates of approximately the width of the shoe; the plates at first extend substantially radially at the extremities of the shoe and then upwardly parallel to each other.

The axial edges of the end plates 22 are connected by side members which overhang the axial edges of the shoe 1 and are suitably spotwelded or otherwise secured thereto. A cover 24 fits over the upper edges of the side members and end plates. One of the end plates is provided with a slot 25 having a portion of major width adapted to receive the anchor pin 6 and a portion of minor width forming shoulders 26 against which the extremities of the pin may bear when the constricting band 4 is placed under tension. The other end plate 22 is likewise provided with a slot 27 through which the extended end of the constricting band passes into the housing 21. The end plates 22 journal a screw member 28 which extends from end to end of the housing, and which is provided at one end with a handle 29. The screw member receives a threaded traveler member 30 which is substantially semi-cylindrical in shape and around the rounded side of which extends the second extremity of the constricting band which is welded, soldered or otherwise suitably secured thereto. Between the traveler and the end plate from which the handle 29 extends there is provided a thrust ring 31.

Operation of the clamp shown in Figures 3, 4 and 5 is as follows: Rotation of the screw member 28 in one direction causes the traveler 30 to move from the solid line position to the dotted line position shown in Figure 4, which draws upon the extended end of the constricting band and causes the shoes 1 to move radially inward as indicated by dotted lines in Figure 4. The looped, or anchored end, of the constricting band is prevented from movement by reason of the engagement of the ends of the anchor pin 6 with the shoulders 26.

Again, as in Figure 1, the constricting band slides relatively freely upon the shoes 1 so that equal force is applied to all of the shoes and therefore equal constriction of the hose is obtained.

Various changes and alternate arrangements may be made within the scope of the appended claims, in which it is my intention to claim all novelty inherent in the invention.

I claim:

1. A hose clamp comprising: a plurality of segmental shoe elements; links interconnecting said shoe elements circumferentially in end-to-end spaced relationship and with limited freedom for circumferential movement with respect to one another to permit radial movement of said elements toward a common center; a constricting band encircling said shoes and freely slidable thereon; and means for constricting said band.

2. A hose clamp comprising: a plurality of substantially rigid shoe elements arranged about a common center and adapted to fit substantially in equally spaced relation about a hose; links interconnecting said shoe elements circumferentially in end-to-end spaced relationship and with limited freedom for circumferential movement with respect to one another; a constricting band encircling said shoes and slidable thereon and means for constricting said band.

3. A hose clamp comprising: a plurality of substantially rigid shoe elements arranged about a common center and adapted to fit substantially equally spaced apart about a hose; means associated with said shoe elements to restrain said shoe elements against circumferential displacement around said hose; a constricting band encircling said shoes and freely slidable thereon; and means for constricting said band.

4. A hose clamp comprising: a plurality of segmental shoe elements; links interconnecting said shoe elements circumferentially in end-to-end spaced relationship and with limited freedom for circumferential movement with respect to one another to permit radial movement of said elements toward a common center; means restraining said shoe elements against circumferential displacement around said hose; a constricting band encircling said shoes and freely slidable thereon; and means for constricting said band.

5. A hose clamp comprising: a plurality of segmental shoe elements; links interconnecting said shoe elements circumferentially in end-to-end spaced relationship and with limited freedom for circumferential movement with respect to one another to permit radial movement of said elements toward a common center; a constricting band encircling said shoes and slidable thereon; means anchoring one end of said band relative to one of said shoe elements; and means associated with said shoe element for drawing the other end of said band circumferentially toward said anchored end, thereby to constrict said band and urge the segmental shoe elements radially inwardly.

6. A hose clamp comprising: a plurality of substantially rigid shoe elements arranged about a common center and adapted to fit substantially equally spaced about a hose; links interconnecting said shoe elements circumferentially in end-to-end spaced relationship and with limited freedom for circumferential movement with respect to one another; a constricting band encircling said shoes and slidable thereon; means anchoring one end of said band relative to one of said shoe elements; and means associated with said shoe element for drawing the other end of said band circumferentially toward said anchored end, thereby to constrict said band and urge the segmental shoe elements radially inwardly.

7. A hose clamp comprising: a plurality of substantially rigid shoe elements arranged about a common center and adapted to fit substantially equally spaced apart about a hose; means associated with said shoe elements to restrain said shoe elements against circumferential displacement around said hose; a constricting band encircling said shoes and freely slidable thereon; means for anchoring one end of said band relative to one of said shoe elements; and means associated with said shoe element for drawing the remaining end of said band circumferentially toward said anchored end, thereby to constrict said band and urge the segmental shoe elements radially inwardly.

8. A hose clamp comprising: a plurality of segmental shoe elements; links interconnecting said shoe elements circumferentially in end-to-end spaced relationship and with limited freedom for circumferential movement with respect to one another to permit radial movement of said elements toward a common center; means associated with said shoe elements to restrain said shoe elements against circumferential displacement around said hose; a constricting band encircling said shoes and slidable thereon; means for anchoring one end of said band relative to one of said shoe elements; and means associated with said shoe element for drawing the remaining end of said band circumferentially toward said anchored end, thereby to constrict said band and urge the segmental shoe elements radially inwardly.

9. A hose clamp comprising: a plurality of segmental shoe elements; means connecting said shoe elements to permit radial movement of said elements toward a common center; a constricting band encircling said shoes and freely slidable thereon; a screw and a traveler carried thereby;

means mounting and journaling said screw relative to one of said shoe elements; means anchoring one end of said band with respect to said shoe element, the other end of said band being connected with said traveler whereby, upon movement of said traveler along said screw, said band is contracted or dilated.

10. A hose clamp comprising: a plurality of arcuate shoe elements adapted to fit around a hose; a band encircling said shoes and slidable thereon; a screw and a traveler carried thereby; means mounting and journaling said screw relative to one of said shoe elements; and means anchoring one end of said band with respect to said shoe element, the other end of said band being conected with said traveler whereby, upon movement of said traveler along said screw, said band is contracted or dilated, the confronting surfaces of said band and shoe elements being relatively smooth and affording a sliding connection having a low coefficient of friction.

11. A hose clamp comprising: a plurality of substantially rigid shoe elements arranged about a common center and adapted to fit substantially equally spaced about a hose; a constricting band encircling said shoes and slidable thereon; a housing carried by one of said shoe elements; a screw journaled within said housing and restrained against axial movement; means for anchoring one end of said band with respect to said housing; and a traveler member connected with the other end of said band, said traveler member being threaded on said screw and restrained against rotation by said housing.

12. A hose clamp comprising: a plurality of segmental shoe elements; means connecting said shoe elements to permit radial movement of said elements toward a common center; means restraining said shoe elements against circumferential displacement around said hose; a constricting band encircling said shoes and slidable thereon; means for constricting said band, said constricting means including a device on one of said shoe elements for anchoring said band, a perforated lug projecting from said shoe element, a screw-threaded stem secured to the other end of said band and extending through said lug, and a nut for said stem.

13. A hose clamp comprising: a plurality of segmental shoe elements; links interconnecting said shoe elements circumferentially in end-to-end spaced relationship and with limited freedom for circumferential movement with respect to one another to permit radial movement of said elements toward a common center; a constricting band encircling said shoes and freely slidable thereon; retainer lugs slidably supporting said shoe elements on said band; and means for constricting said band.

14. A hose clamp comprising: a plurality of segmental shoe elements; links interconnecting said shoe elements circumferentially in end-to-end spaced relationship and with limited freedom for circumferential movement with respect to one another to permit radial movement of said elements toward a common center; a constricting band encircling said shoes and freely slidable thereon; retainer lugs carried by said shoe elements and extending over the marginal portions of said band slidably supporting said shoe elements on said band; and means for constricting said band.

15. A hose clamp comprising: a plurality of segmental shoe elements arranged about a common center in end to end circumferentially spaced-apart relationship and with limited freedom for circumferential movement with respect to one another to permit radial movement of said shoe elements toward a common center; a constricting band encircling said shoe elements and slidable circumferentially thereon; retainer means associated with said shoe elements and said band to support said shoe elements circumferentially slidable on said band; and means for constricting said band.

GERHARD MEYER.